United States Patent [19]

Mueller

[11] Patent Number: 4,505,346

[45] Date of Patent: Mar. 19, 1985

[54] ROLLING VEHICLE

[75] Inventor: Leonard E. Mueller, 4557 Mt. Hubbard Ave., San Diego, Calif. 92117

[73] Assignees: Leonard E. Mueller; Carl R. Brown, both of San Diego, Calif.

[21] Appl. No.: 362,877

[22] Filed: Mar. 29, 1982

[51] Int. Cl.[3] .............................................. B62D 57/04
[52] U.S. Cl. ..................................... 180/7.4; 180/21; 244/2; 280/206; 440/37; 440/100; 446/178; 446/458; 446/460; 446/462
[58] Field of Search ................. 180/7 P, 116, 21, 209, 180/10; 280/29, 200, 205, 206, 207, 208, 210, 28.5; 440/37, 100, 99; 244/64, 67, 4, 2; 114/270; 272/115, 1 B, 34, 35; 46/251, 206, 96

[56] References Cited

U.S. PATENT DOCUMENTS

| | | | |
|---|---|---|---|
| 89,128 | 4/1869 | Cohu | 280/206 |
| 1,046,267 | 12/1912 | Coates | 180/10 |
| 1,316,408 | 9/1919 | Babb | 280/207 |
| 1,495,347 | 5/1924 | Neubauer | 180/21 |
| 1,905,345 | 4/1933 | Dandini | 440/100 |
| 3,876,025 | 4/1975 | Green | 180/21 |

FOREIGN PATENT DOCUMENTS 607688 1/1935 Fed. Rep. of Germany ........ 180/21

Primary Examiner—Joseph F. Peters, Jr.
Assistant Examiner—Mitchell J. Hill
Attorney, Agent, or Firm—Brown, Martin & Haller

[57] ABSTRACT

A rolling vehicle having a generally spherical cage-like body with a diametrical axle on which a pod is suspended within the cage structure. The pod contains a propulsion unit which provides thrust for driving the vehicle in a particular direction and also carries aerodynamic lift and control surfaces. When the vehicle is rolling, the lifting surfaces reduce the bearing load of the vehicle on the supporting surface and the control surfaces provide directional control. Outrigger stabilizing wheels on the ends of the axle provide basic stability and can be made of buoyant material for operation on water.

12 Claims, 6 Drawing Figures

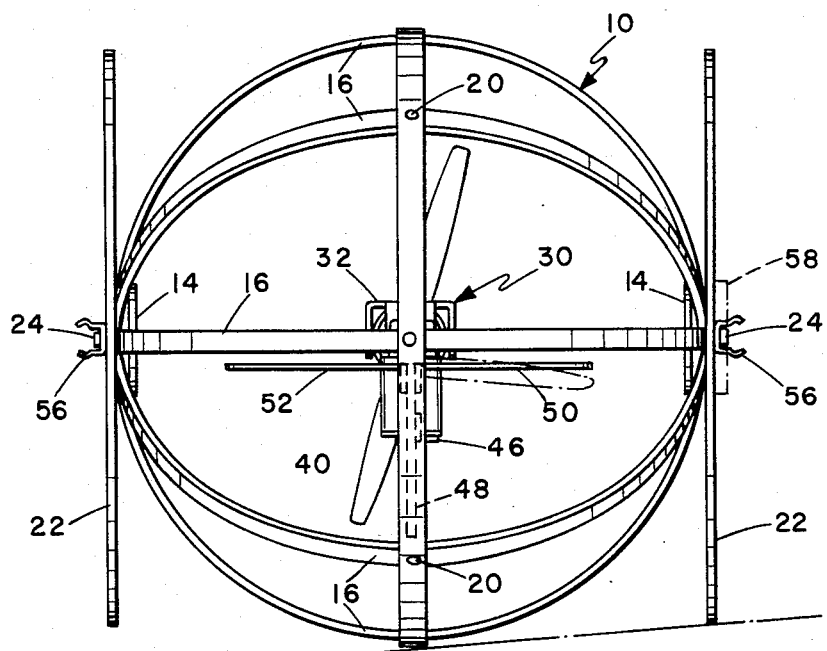
Fig. 3
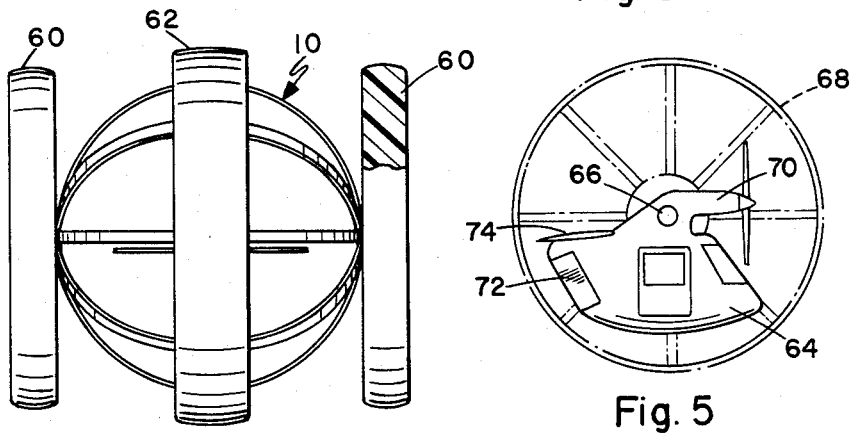
Fig. 4
Fig. 5
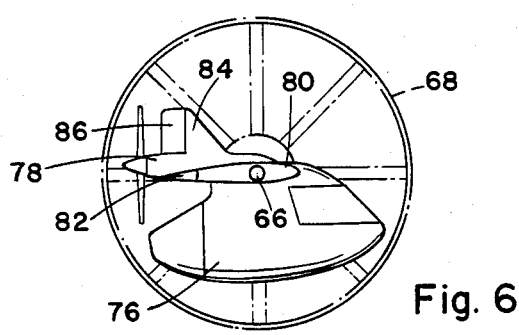
Fig. 6

ROLLING VEHICLE

BACKGROUND OF THE INVENTION

Vehicles of the type used for all terrain travel have used a variety of special wheels, tires, tracks, multiple wheel drives and the like, most of which add greatly to the cost of the vehicle. Most of these vehicles utilize driven wheels or tracks, requiring transmissions and geared drives which are subjected to severe stresses.

Some early designs of bicycles and motorcycles used large driven wheels with a seat suspended between them, while other types had a single large wheel with the seat and power source riding on the inside of the rim. None of these was particularly successful nor capable of all terrain operation.

SUMMARY OF THE INVENTION

The vehicle described herein comprises a generally spherical body of open cage-like construction, with a propulsion and control pod suspended from a diametrical axle within the body. Propulsion is by reaction thrust means, such as a propeller, with no drive connection to the body and thus no gear mechanism to consider. The pod also carries aerodynamic lifting and control surfaces. In the slipstream of the propeller, the control surfaces are effective, even at low speeds, to guide the vehicle. In forward motion, the lifting surfaces provide aerodynamic lift and so reduce the bearing load of the vehicle on the supporting surface, which enables the vehicle to negotiate soft ground such as sand, swamp, or the like.

To prevent the vehicle from rolling sideways or becoming inverted, outrigger stabilizing wheels are mounted at opposite ends of the axle. These also provide control in the turning action of the vehicle and provide additional support on the surface.

The vehicle can be made in a wide range of sizes, from toys to large cargo carrying types. It is also a simple matter to adapt the vehicle for operation on water, by using flotation material on the outrigger wheels and on a support and rolling ring surrounding the body between the wheels.

The primary object of this invention, therefore, is to provide a new and improved rolling vehicle.

Another object of this invention is to provide a rolling vehicle having a generally spherical cage-like body with reaction propulsion means suspended in the body.

Another object of this invention is to provide a rolling vehicle having lateral stabilizing wheels thereon and directional control means incorporated in the propulsion unit.

A further object of this invention is to provide a rolling vehicle capable of operating on almost any type of terrain.

Other objects and advantages will be apparent in the following detailed description, taken in conjunction with the accompanying drawings, in which:

FIG. 3 is a rear elevation view of the vehicle of FIG. 1.

FIG. 4 is a rear elevation view on a reduced scale, showing flotation means for operation on water.

FIG. 5 is a side elevation view of a large vehicle with a cargo carrying pod.

FIG. 6 is a side elevation view of a further large vehicle with an enlarged lifting surface.

DESCRIPTION OF THE PREFERRED EMBODIMENTS

Figure 1:
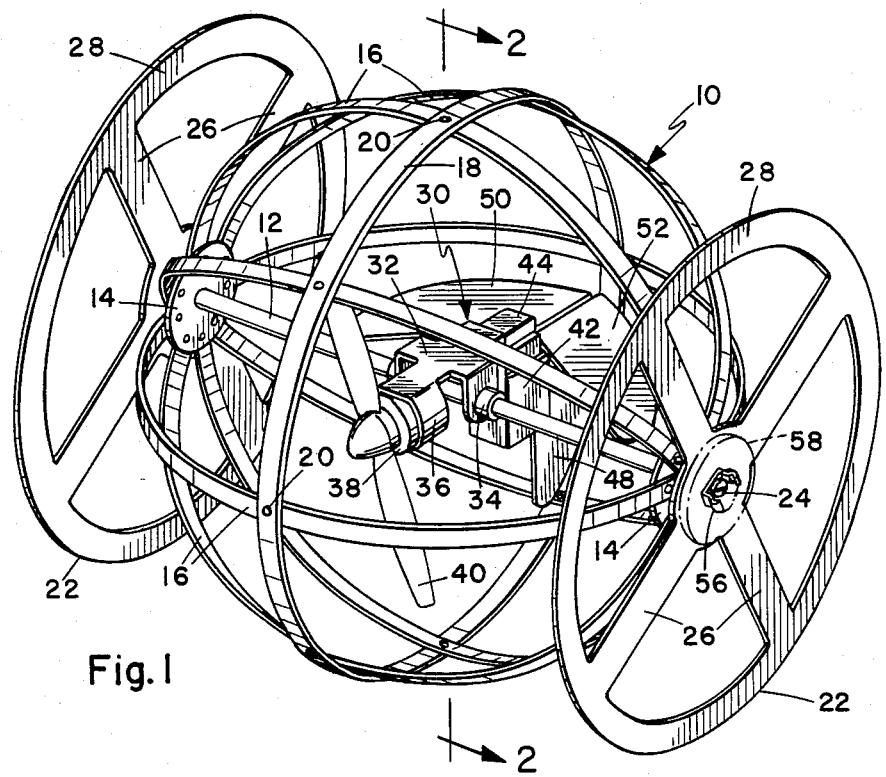
FIG. 1 is a perspective view of one configuration of the rolling vehicle.
Figure 2:
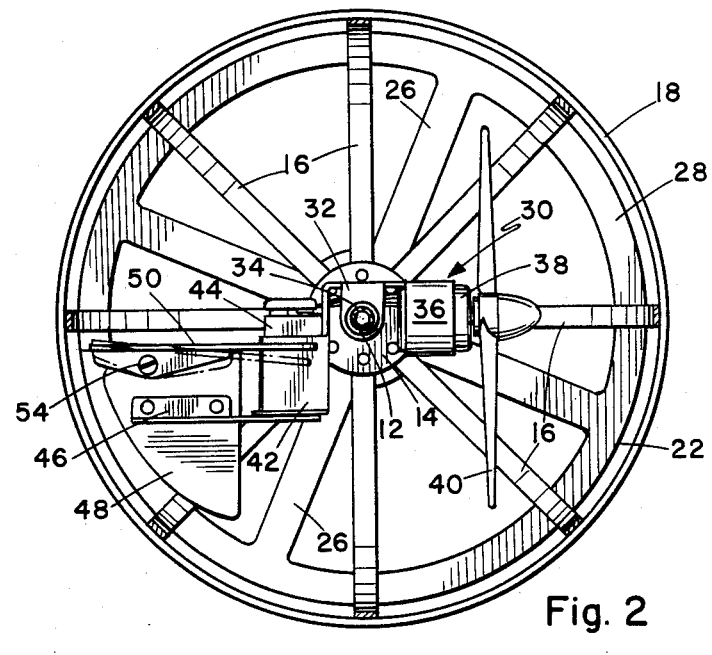
FIG. 2 is a sectional view taken on line 2—2 of FIG. 1.

The configuration of the vehicle illustrated in FIGS. 1–3 is an electrically driven toy version which has been tested and serves to demonstrate the characteristics of the vehicle.

The generally spherical body 10 has an axle 12 at the axis of rotation, with circular hub caps 14 mounted at opposite ends. Semi-circular ribs 16 are secured between the hub caps 14 and extend radially, the ribs being angularly spaced to enclose a sphere. Centered between the hub caps is a rolling ring 18, secured equatorially to the ribs 16 concentric with axle 12. Rolling ring 18 is secured to the center of each rib 16 by a rivet 20, or similar means, to stiffen the structure and hold the ribs in spaced alignment.

In the toy configuration, the ribs and rolling ring can be flat strip metal or plastic material, rivetted or otherwise fastened in place. As illustrated, the body has eight ribs spaced 45 degrees apart, but any suitable number may be used.

At opposite ends of the axle 12 are outrigger stabilizing wheels 22, fixed in any suitable manner to hub caps 14 or to the axle 12, such as by screws 24 threaded into the ends of the axle. Wheels 22 are slightly smaller in diameter than the rolling ring 18, so that both wheels can be clear of the ground when the vehicle is in stable forward motion. In a turn, the vehicle will be supported on the rolling ring and one wheel, as in FIG. 3, which limits the lateral rolling action of the body and stabilizes the turn. The turning radius is thus limited by the difference in diameters of the rolling ring and the stabilizing wheels.

Wheels 22 are preferably lightweight units with spokes 26 and a rim 28. In the small toy version, this can be a unitary structure made from flat sheet material as shown.

Mounted on the central portion of axle 12 is a pod 30 having a saddle bracket 32, which is pivotal on the axle and is centered between collars 34. Extending forwardly from the saddle bracket 32 is a motor mount 36 holding an electric motor 38, which drives a propeller 40. The thrust axis of the propeller is generally perpendicular to axle 12 but can be above or below the axle. On the rear of saddle bracket 32 is a battery holder 42 containing a battery 44 which is connected to the motor 38. A switch, not shown, may be installed in any convenient position on the pod.

Projecting rearwardly from the battery holder 42 is a bracket 46 on which is mounted a vertical fin 48. On the upper portion of fin 48 are wings 50 and 52 extending on opposite sides, the wings being secured by a screw 54, or similar means, so as to be adjustable in pitch. As illustrated, the pod and the aerodynamic surfaces are made from flat sheet material, but any suitable structural arrangement could be used. In any configuration the structure is arranged so that the center of gravity of the pod assembly is below the axle, to give the pod pendulum stability. The thrust line of the propeller is shown as neutral relative to the control surfaces, but the thrust line can be varied as necessary to suit the performance required and to conform to the normal balanced position of the pod.

In forward motion, the wings provide aerodynamic lift which minimizes the bearing load of the vehicle on the supporting surface. The wings can be collectively or individually adjusted in pitch to control lift and provide directional control. In FIGS. 2 and 3, the wing 50 is shown in broken line to have a negative pitch, or trailing edge raised, which would cause a banking action to the right. This would bring the right side wheel 22 into contact with the surface, as in FIG. 3, and initiate a right turn.

In the simple free running version of the vehicle, a sustained turn can also be obtained by ballasting one side of the vehicle. This is easily accomplished by securing a spring clip 56 to each end of axle 12, or to each wheel 22, and snapping a washer-like weight 58 on the clip on the required side. The resultant unbalance causes the vehicle to turn consistently in one direction, so that while obstacles or variations in the terrain may deflect the vehicle, it will eventually return to the vicinity of the starting point and simplify retrieval. Alternatively, the power pod may be angularly offset laterally to either side to provide a small side thrust and also offset the center of mass, so that a constant turn is induced.

The manually preset control surfaces provide the simplest means of controlling the vehicle. However, it would be simple to install a radio control system to actuate the control surfaces in a well known manner to provide full control of the vehicle. Speed control of the motor could also be used for optimum performance. The propulsion is not limited to electric power but could utilize a small reciprocating engine as used in model aircraft, which would extend the operating time of the vehicle over that of an electrically powered version.

Since the slipstream from the propeller flows over a large portion of the control surface area, control is effective even at low speeds. The vehicle has been found to be capable of high speeds and, with adequate aerodynamic lift, approaches a condition of flight, while maintaining control by the minimal contact with the surface.

The vehicle can be readily adapted for operation on water by making all or part of the stabilizing wheels of buoyant material, as in FIG. 4. One of the wheels 60 is partially cut away to indicate foam plastic as a suitable material, but an inflatable wheel would also be practical. For additional support, a buoyant rolling ring 62 is attached to or substituted for the ring 18 around the body 10. It has been found that the small toy version equipped with the buoyant elements will operate well on a beach and transfer to and from the water very easily.

The structure is also adaptable to a large vehicle with a pod large enough to contain an operator and cargo, as in FIG. 5. The pod 64 is suspended from the axle 66 of a spherical body 68, which is indicated in broken line for clarity. The upper forward portion of the pod 64 carries a propulsion unit 70 and at the rear are vertical and horizontal control surfaces 72 and 74, respectively.

A further large type vehicle is illustrated in FIG. 6, in which a pod 76 is suspended from the axle 66 of a body 68. A propulsion unit 78 is mounted at the rear of the pod 76 in a pusher configuration. A large lifting surface or wing 80, indicated by the airfoil section, is mounted generally on the plane of the axle 66 and extends forward of the axle. The center of lift of the wing 80 is substantially at the axle so that a considerable lift can be generated at high speed to support the vehicle. The pusher type propulsion avoids blowing sand and debris over the windows of the passenger pod while in motion, which improves visibility and minimizes abrasion of the structure.

Control surfaces 82 are mounted at the trailing edge of the wing and a vertical fin 84 with a rudder 86 is used for directional control.

With the large wing, sufficient lift can be developed so that the vehicle is essentially flying in ground effect. Yet, at any time, the rolling body can contact the ground surface for support.

The configurations illustrated are exemplary, the body construction, pod arrangement, type of propulsion and aerodynamic characteristics being variable to suit the size of the vehicle and the required performance.

Having described my invention, I now claim:

1. A rolling vehicle, comprising:
    a generally spherical body of open framework construction having an axle at the axis of rotation, a plurality of substantially semi-circular ribs secured between opposite ends of the axle and extending radially therefrom at angularly spaced positions;
    a pod pivotally mounted on the central portion of said axle within the body and containing propulsion means having a thrust axis substantially perpendicular to the axle;
    the center of gravity of said pod being below the axle;
    and aerodynamic lifting and directional control surfaces mounted on said pod, said lifting surfaces being substantially horizontal and having aerodynamic lift characteristics capable of supporting a substantial part of the weight of the vehicle in forward motion.

2. A rolling vehicle according to claim 1, and including a rolling ring fixed to the central portion of said body, perpendicular to and concentric with said axle, the rolling ring being secured to the interconnecting said ribs.

3. A rolling vehicle according to claim 2, and including hub caps secured to opposite ends of said axle, said ribs being attached to said hub caps.

4. A rolling vehicle according to claim 3, and including stabilizing wheels mounted on opposite ends of said axle and fixed relative to said hub caps, the wheels being smaller in diameter than the spherical diameter of said body.

5. A rolling vehicle according to claim 1, wherein said propulsion means is generally forward of the axle; said aerodynamic surfaces including horizontal and vertical surfaces extending rearwardly of the axle.

6. A rolling vehicle according to claim 5, wherein said horizontal surfaces are individually adjustable in pitch relative to the thrust axis of the propulsion means.

7. A rolling vehicle according to claim 5, wherein said horizontal surfaces comprise a lifting wing with a center of lift near the axis of said axle, and movable control surfaces mounted on the wing.

8. A rolling vehicle according to claim 5, wherein said propulsion means includes a driven propeller, a substantial portion of said aerodynamic surfaces being disposed in the slipstream of the propeller.

9. A rolling vehicle comprising:
    a generally spherical body of open framework construction having an axle at the axis of rotation, hub caps secured to opposite ends of said axle, a plurality of substantially semicircular ribs secured between said hub caps and extending radially therefrom at angularly spaced positions;

a rolling ring fixed to the central portion of said body, perpendicular to and concentric with said axle, the rolling ring being secured to and interconnecting said ribs;

stabilizing wheels mounted on opposite ends of said axle and fixed relative to said hub caps, the wheels being smaller in diameter than the spherical diameter of the body;

said stabilizing wheels being buoyant;

a pod pivotally mounted on the central portion of said axle and containing propulsion means having a thrust axis substantially perpendicular to the axle;

the center of gravity of said pod being below the axle;

and aerodynamic lifting and directional control surfaces mounted on said pod.

10. A rolling vehicle according to claim 9, wherein said rolling ring is also buoyant.

11. A rolling vehicle comprising:

a generally spherical body of open framework construction having an axle at the axis of rotation, hub caps secured to opposite ends of said axle, a plurality of substantially semicircular ribs secured between said hub caps and extending radially therefrom at angularly spaced positions;

a rolling ring fixed to the central portion of said body, perpendicular to and concentric with said axle, the rolling ring being secured to and interconnecting said ribs;

stabilizing wheels mounted on opposite ends of said axle and fixed relative to said hub caps, the wheels being smaller in diameter than the spherical diameter of the body;

a pod pivotally mounted on the central portion of said axle and containing propulsion means having a thrust axis substantially perpendicular to the axle;

said propulsion means including an electric motor mounted on said pod forward of the axle and carrying a driven propeller, and a motor actuating battery mounted on the pod rearwardly of the axle;

the center of gravity of said pod being below the axle;

and aerodynamic lifting and directional control surfaces mounted on the pod with horizontal and vertical surfaces extending rearwardly of the axle, a substantial portion of the aerodynamic surfaces being disposed in the slipstream of the propeller.

12. A rolling vehicle according to claim 11, and including attachment means on at least one of said wheels for attachment of a weight thereto to unbalance the vehicle to one side.

* * * * *